(12) United States Patent
Nguyen

(10) Patent No.: US 7,412,495 B2
(45) Date of Patent: Aug. 12, 2008

(54) METHOD, SYSTEM, AND ARTICLE OF MANUFACTURE FOR A SERVER SIDE APPLICATION

(75) Inventor: Shawn X. Nguyen, Golden, CO (US)

(73) Assignee: Sun Microsystems, Inc., Santa Clara, CA (US)

( * ) Notice: Subject to any disclaimer, the term of this patent is extended or adjusted under 35 U.S.C. 154(b) by 432 days.

(21) Appl. No.: 10/133,014

(22) Filed: Apr. 26, 2002

(65) Prior Publication Data
US 2003/0204559 A1  Oct. 30, 2003

(51) Int. Cl.
*G06F 15/16* (2006.01)
(52) U.S. Cl. .................. 709/219; 709/246; 719/311
(58) Field of Classification Search .......... 709/219, 709/237, 203, 201, 217, 229, 246; 707/513; 705/14; 455/435; 378/58; 370/401; 719/330, 719/311
See application file for complete search history.

(56) References Cited

U.S. PATENT DOCUMENTS

| | | | | |
|---|---|---|---|---|
| 5,941,994 A * | 8/1999 | DeKoning et al. | ............ | 714/7 |
| 6,336,137 B1 * | 1/2002 | Lee et al. | ............ | 709/219 |
| 6,397,225 B1 * | 5/2002 | Brown et al. | ............ | 707/104.1 |
| 6,449,640 B1 * | 9/2002 | Haverstock et al. | ............ | 709/219 |
| 6,507,891 B1 * | 1/2003 | Challenger et al. | ............ | 711/122 |
| 6,557,024 B1 * | 4/2003 | Saito et al. | ............ | 709/201 |
| 6,609,150 B2 * | 8/2003 | Lee et al. | ............ | 709/219 |
| 6,631,424 B1 * | 10/2003 | McDonough et al. | ............ | 719/330 |
| 6,668,271 B1 * | 12/2003 | Wolff | ............ | 709/202 |
| 6,671,346 B2 * | 12/2003 | Baumann et al. | ............ | 378/58 |
| 6,728,536 B1 * | 4/2004 | Basilier et al. | ............ | 455/432.1 |
| 6,738,789 B2 * | 5/2004 | Multer et al. | ............ | 707/201 |
| 6,772,408 B1 * | 8/2004 | Velonis et al. | ............ | 717/100 |
| 6,775,291 B1 * | 8/2004 | Ryu et al. | ............ | 370/401 |
| 6,950,872 B2 * | 9/2005 | Todd, II | ............ | 709/227 |
| 6,970,813 B1 * | 11/2005 | Houlding et al. | ............ | 703/13 |
| 7,025,209 B2 * | 4/2006 | Hawkins | ............ | 209/217 |
| 7,028,312 B1 * | 4/2006 | Merrick et al. | ............ | 719/330 |
| 7,103,627 B2 * | 9/2006 | Kittredge et al. | ............ | 709/201 |
| 7,127,713 B2 * | 10/2006 | Davis et al. | ............ | 717/177 |
| 7,296,226 B2 * | 11/2007 | Junkermann | ............ | 707/102 |
| 2001/0046862 A1 * | 11/2001 | Coppinger et al. | ............ | 455/435 |
| 2001/0047294 A1 * | 11/2001 | Rothschild | ............ | 705/14 |
| 2002/0002602 A1 * | 1/2002 | Vange et al. | ............ | 709/219 |

(Continued)

FOREIGN PATENT DOCUMENTS

WO    WO 9853581 A1 * 11/1998

OTHER PUBLICATIONS

Michael Cymerman, "Building A Java servlet framework using reflection, part 2", Feb. 2000, Java World, 15 pages.*

(Continued)

*Primary Examiner*—Douglas B Blair
(74) *Attorney, Agent, or Firm*—Chapin IP Law, LLC

(57) ABSTRACT

Provided are a method, system, and article of manufacture for processing requests in a server side application. The server side application receives a request in a communications protocol from a client. The server side application modifies the request to create a communications protocol independent request. The server side application generates a response by processing the communications protocol independent request. Subsequently, the server side application sends the generated response in the communications protocol to the client.

54 Claims, 7 Drawing Sheets

U.S. PATENT DOCUMENTS

| | | | |
|---|---|---|---|
| 2002/0002611 A1* | 1/2002 | Vange | 709/223 |
| 2002/0002636 A1* | 1/2002 | Vange et al. | 709/328 |
| 2002/0019853 A1* | 2/2002 | Vange et al. | 709/207 |
| 2002/0052968 A1* | 5/2002 | Bonefas et al. | 709/231 |
| 2002/0075303 A1* | 6/2002 | Thompson et al. | 345/751 |
| 2002/0103811 A1* | 8/2002 | Frankhauser et al. | 707/104.1 |
| 2002/0116354 A1* | 8/2002 | Baudu et al. | 706/47 |
| 2003/0046317 A1* | 3/2003 | Cseri et al. | 707/513 |
| 2003/0054810 A1* | 3/2003 | Chen et al. | 455/422 |
| 2003/0074455 A1* | 4/2003 | Banning et al. | 709/229 |
| 2003/0145103 A1* | 7/2003 | Pruyne et al. | 709/237 |
| 2003/0154139 A1* | 8/2003 | Woo | 705/26 |
| 2004/0015891 A1* | 1/2004 | Arellano-Payne et al. | 717/137 |
| 2005/0014494 A1* | 1/2005 | Owen et al. | 455/419 |
| 2006/0036448 A1* | 2/2006 | Haynie et al. | 705/1 |

OTHER PUBLICATIONS

Thomas E. Davis and Craig Walker, "Take Control of teh Servlet Environment, Part 2", Dec. 2000, Java World, 12 pages.*

Tony Sintes, "Clients can invoke servlet too", Jan. 2002, java World, 4 pages.*

Macromedia, "Servelet and JSPs", JRun LiveDocs, 4 pages.*

* cited by examiner

METHOD, SYSTEM, AND ARTICLE OF MANUFACTURE FOR A SERVER SIDE APPLICATION

BACKGROUND OF THE INVENTION

1. Field of the Invention

The present invention relates to a method, system, and an article of manufacture for a server side application.

2. Description of the Related Art

Software applications may reside on a server and be accessible from one or more clients. Such server side applications may execute on a Web server and a client may use a Web browser to access the applications. The applications may range from simple online forms submission to complex online securities trading.

In prior art, a server side application may receive an initial request from a client to access the application. The server side application may authenticate the client before allowing access to the application. Following the authentication, the server side application establishes a session with the client. Subsequently, in response to a request from the client, the server side application retrieves information from back-end databases. The server side application formats the information into Hypertext Markup Language (HTML) pages and sends the pages to the client for display on a Web browser.

Programming a server-side application is difficult. Significant resources may have to be spent in learning the details of a complicated programming system to implement a server-side application. In addition, different server-side applications may be written with different components. As a result, server side applications may be difficult to comprehend and maintain. Hence, there is a need in the art to provide improved techniques for developing and coding a server side application.

SUMMARY OF THE PREFERRED EMBODIMENTS

Provided are a method, system, and article of manufacture for processing requests in a server side application. The server side application receives a request in a communications protocol from a client. The server side application modifies the request to create a communications protocol independent request. The server side application generates a response by processing the communications protocol independent request. Subsequently, the server side application sends the generated response in the communications protocol to the client.

In one implementation, the server side application comprises a plurality of components, including a servlet component, a router component, and a handler component. The server side application receives the request from the client at the servlet component, wherein the servlet component modifies the request to create the communications protocol independent request, and forwards the request to the router component, wherein the communications protocol independent request is created by removing commmands specific to the communications protocol. The router component selects the handler component and routes the forwarded request from the router component to the selected handler component. The routed request is processed with the selected handler component, and information generated, wherein the information is to be included in the response.

In an additional implementation, provided are a method, system and article of manufacture for creating a server side application. Server side application components are installed on a computational device, wherein the server side application components are coded to perform default request handling operations, wherein the default request handling operations include a communication protocol to manage communications with remote clients submitting requests to the server side applications. Code modifications are received to at least one server side application component to cause the at least one server side component to perform user specified server side application operations that are independent of the communications protocol. Executable code is generated from the installed server side application components including the code modifications.

The implementations provide a server side application, where the server side application arranges the common steps of any server side application into a number of modular components. A programmer may modify some of the modular components of the server side application to implement a new server side application. As a result, the implementations simplify the development and maintenance of new server side applications.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several implementations. It is understood that other implementations may be utilized and structural and operational changes may be made without departing from the scope of the present implementations.

Recognizing that many server side applications perform a set of common steps, the implementation provides a programming framework which may be updated to design and develop a server side application. The framework may be implemented as an application that arranges the common steps of a server side application into a number of modular components. A programmer would utilize the components of the framework to implement a server side application.

Figure 1:
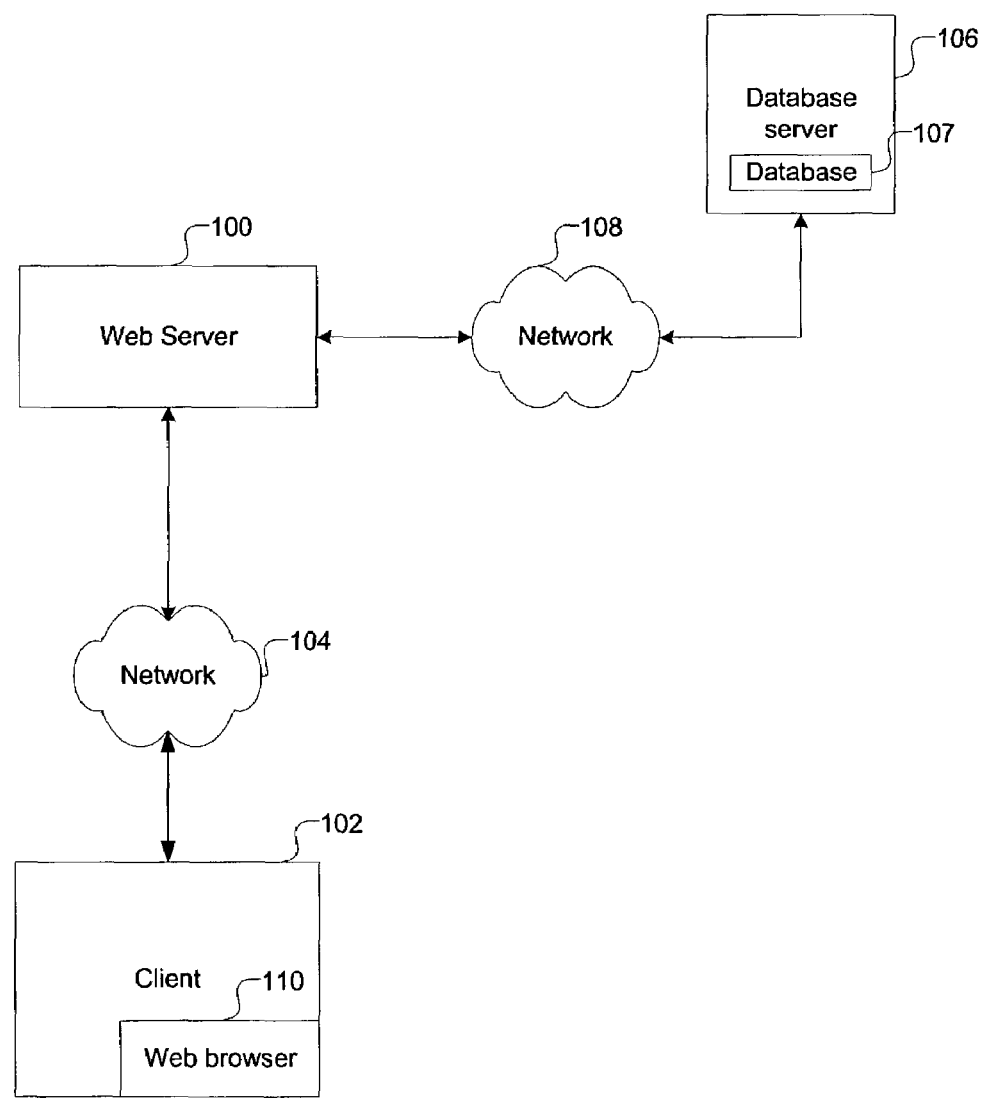
FIG. 1 illustrates a block diagram of a computing environment in which certain described aspects of the invention are implemented.

FIG. 1 illustrates a block diagram of a computing environment in which certain aspects of the invention are implemented. A Web server 100 is in communication with a client 102 over a network 104. The Web server 100 is also in communication with a database server 106, where the database server 106 includes a database 107, over a network 108. The client 102 may include a communication and display software, such as a Web browser 110, to communicate with the Web server 100 over the network 104.

The Web server 100, the client 102 and the database server 106 maybe any computational device known in the art, such as a personal computer, a workstation, a server, a mainframe, a hand held computer, a palm top computer, a telephony device etc. The networks 104, 108 may be any network known in the art, such as the Internet, an intranet, a Local area network (LAN), a storage area network (SAN), a Wide area network (WAN), a wireless network etc. Also the networks 104, 108 may be part of one or more larger networks or may be an independent network. The Web server 100 may alternatively be connected to the client 102 and the database server 106 without a network, such as through direct lines, common bus systems etc., in a manner known in the art. The database 107 may include any database known in the art, and in some implementations the functions of the database server 106, including the database 107, may be included in the Web server 100.

Figure 2:
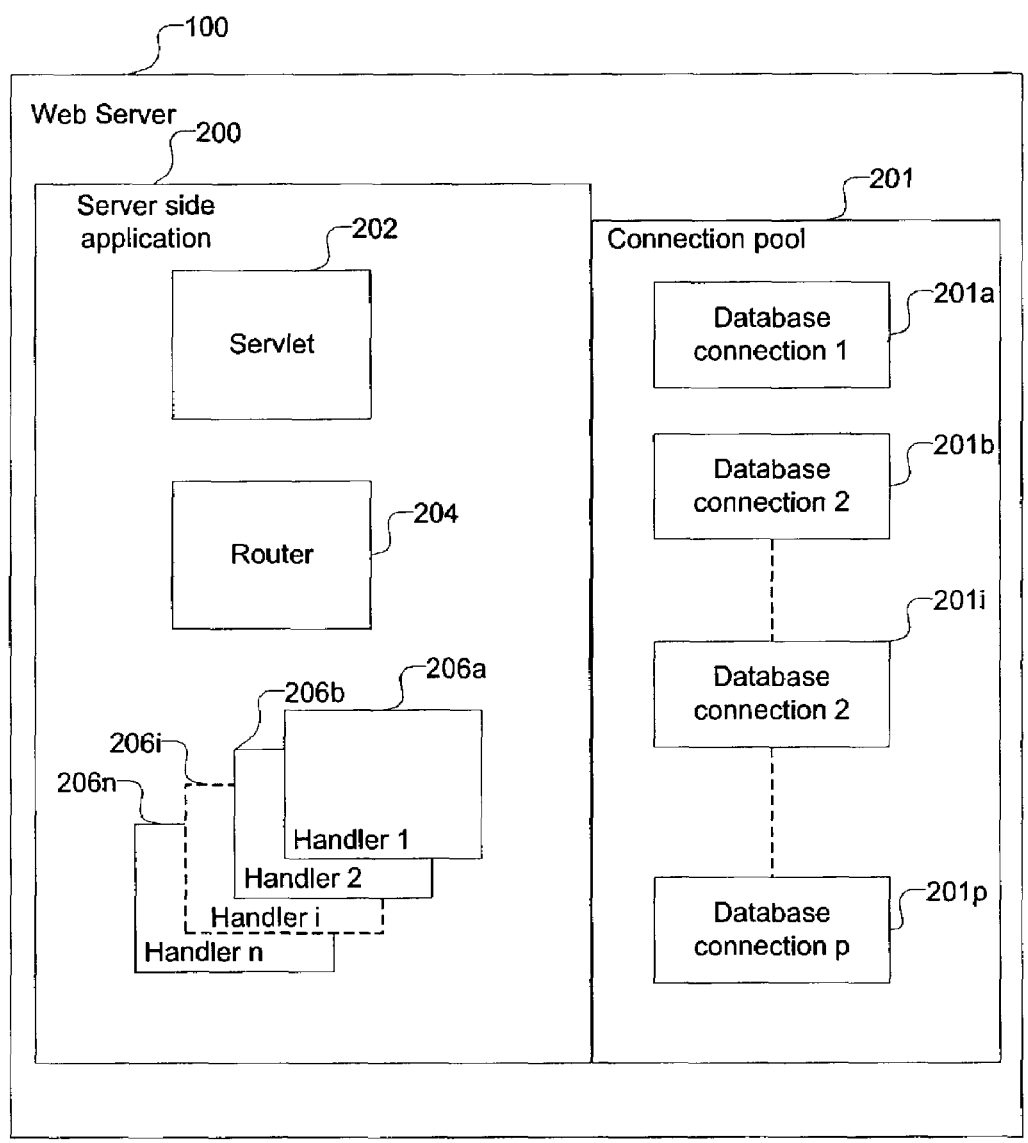
FIG. 2 illustrates a block diagram of software and hardware elements within a Web server in which certain described aspects of the invention are implemented.

FIG. 2 illustrates a block diagram of software and hardware elements within the Web server 100 in which certain aspects of the invention are implemented. A server side application 200 resides on the Web server 100. The server side application 200 implements a framework that can be extended to produce a different server side application. The server side application 200 is coupled to a connection pool 201 of p database connections 201a, . . . 201p, where the database connections 201a, . . . 201p connect to the database server 106. Software components within the server side application 200 may use the database connections 201a, . . . 201p to connect to the database server 106.

The server side application 200 includes various software components 202, 204, 206a . . . 206n. A servlet 202 that may be a Java servlet executes on the Web server 100. Although only one servlet 202 is shown, alternative implementations may have more than one servlet. However, one servlet is adequate for the implementation. The servlet 202 communicates with the client 102 and a router 204. The server side application 200 also includes additional software components, such as n handlers 206a . . . 206n, where a representative handler is labeled as 206i. The router 204 may forward a request from the client 102 to the router 204, and subsequently the router may route the forwarded request to be processed by the handler 206i.

The servlet 202, the router 204 and the handlers 206a, . . . 206n may be modified or additional handlers may be added to generate any type of server side application, that may include a greater or a lesser number of software components.

Figure 3:
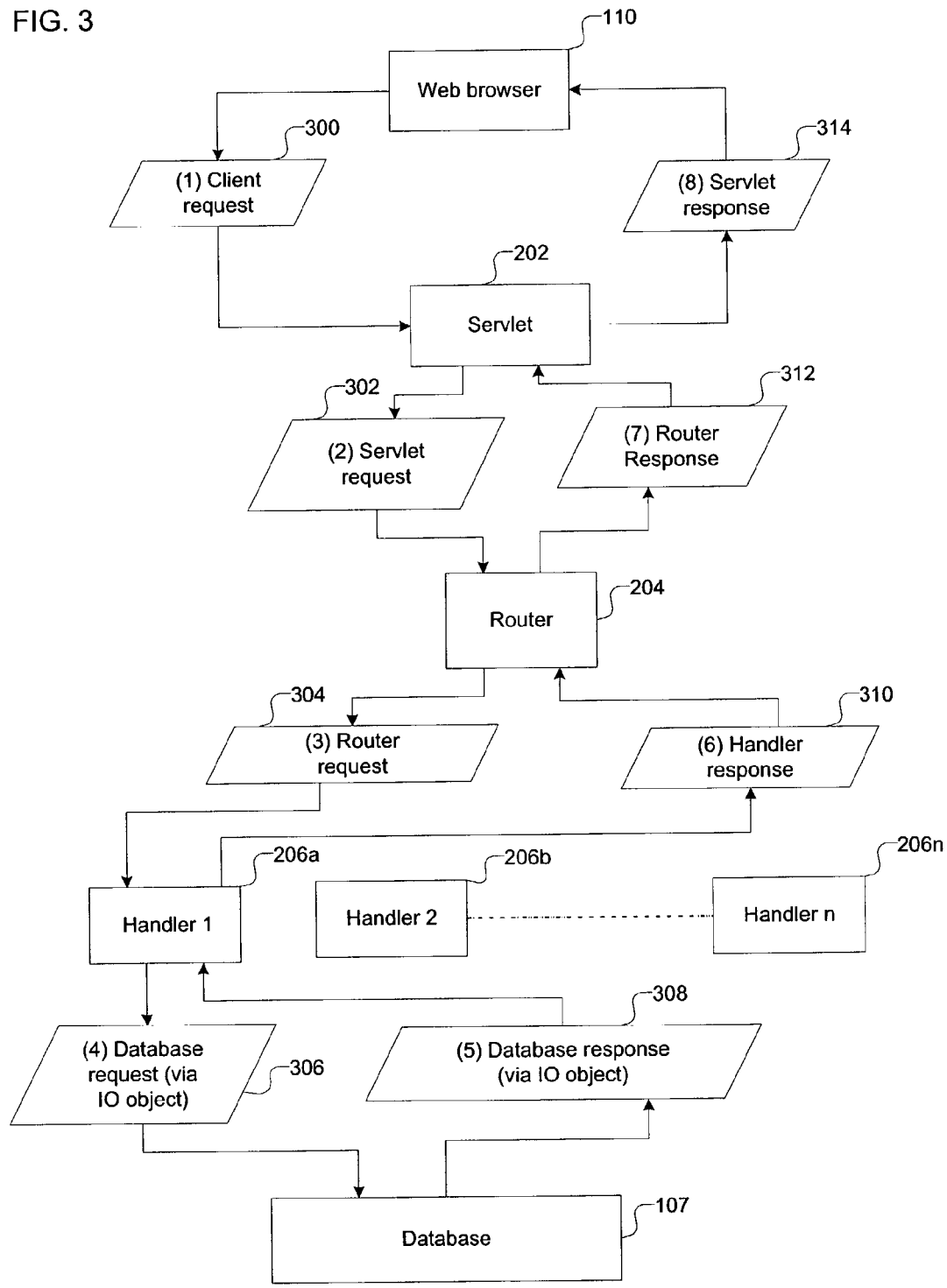
FIG. 3 illustrates a block diagram of software elements and data structures in which certain described aspects of the invention are implemented.
Figure 4:
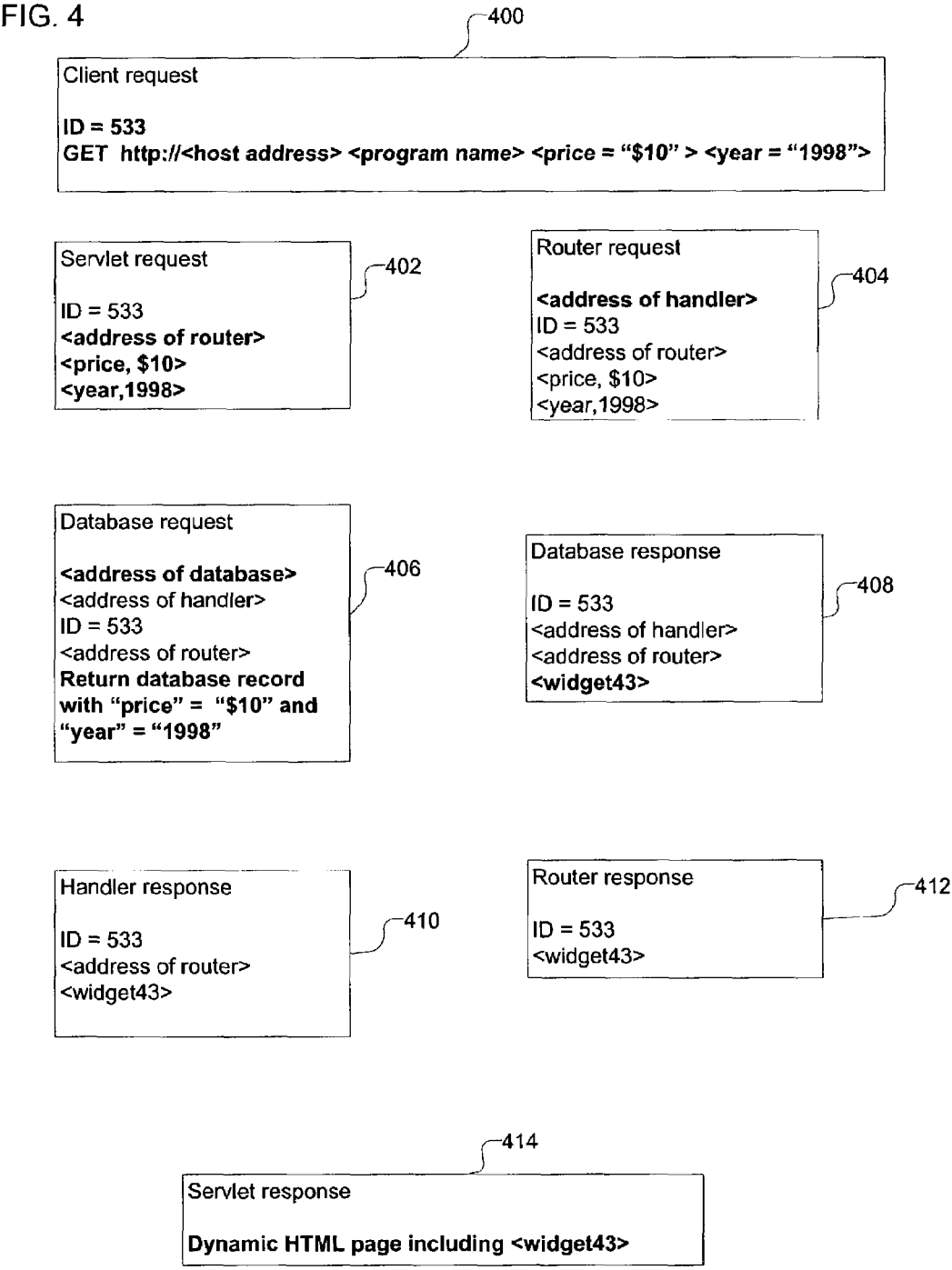
FIG. 4 illustrates exemplary software elements and data structures in which certain described aspects of the invention are implemented.

FIG. 3 and FIG. 4 illustrate block diagrams of software elements and data structures in which certain aspects of the invention are implemented. As illustrated in FIG. 3, the Web browser 110 located on client 102 may send a client request 300 to the servlet 202 located on the Web server 100. The servlet 202 is any server side program capable of interpreting HTTP requests, and may include a Java servlet or a server side program coded in any other programming language. The request may be any request known in the art, such as an HTTP request, a file transfer protocol (FTP) request etc. The request may include user authentication data such as a username and password, and such data may furthermore be transmitted over an HTTPS (secure HTTP) connection. The request may also include user input transmitted in the URL (Universal Resource Locator), and may also include cookies. In other implementations, the user input encoded in the URL is submitted in response to Common Gateway Interface (CGI) based source code included within the server side application 200. The CGI based source code may generate input forms on the Web browser 110. The input forms may be filled in by a user, and the user input may be transmitted from the Web browser 110 to the Web server 100.

FIG. 4 illustrates a client request 400 corresponding to the client request 300. The request 400 includes a session identifier "ID" numbered as "533". The session identifier "ID" uniquely maps a session that the Web browser 110 establishes with the servlet 202. The session identifier "ID" 533 may be used to establish a unique session with the Web browser 110. Based on the session identifier "ID", a session object corresponding to the session identifier "ID" may be looked up. The session object is established and maintained by the server side application 200. The session object may contain any information related to a user, such the login status of the user, the name of the user etc. In certain implementations, the session object may be used in addition to or instead of the session identifier "ID" for session management. The client request 400 also includes an HTTP GET request, where the HTTP GET request includes a host address, i.e. the address of the Web server 100, on which an application named <program name> may be executed. The GET request may also include one or more input parameters to the server side application 200. FIG. 4 shows an input parameter "price" having a value of "$10" and an input parameter "year" having the value of "1998."

Returning to FIG. 3, the servlet 202 converts the client request 300 into a servlet request 302, where the servlet request 302 is in a form such that all the HTTP dependent syntax, such as GET, POST etc. has been removed from the client request 300 by the servlet 302. The servlet 202 forwards the servlet request 302 to the router 204.

FIG. 4 illustrates an exemplary servlet request 402 corresponding to the client request 400. The servlet request 402 may not contain any HTTP syntax such as the GET of the client request 400. In alternative implementations, the servlet request 402 may include some communication protocol statements, such as some features of the HTTP syntax (i.e. some of the communication protocol dependent code may remain in the servlet request 402). The servlet independent request 402 includes the session identifier "ID" of the client request 400, the address of the router, and the input parameters and their values in the form of a hashtable of key and value pairs. The key and value pairs illustrated in the servlet request 402 are <price, $10> and <year, 1998>. The address of the router is needed so that the servlet request 402 is sent to the router. In this way, the servlet 202 maps the client request 400 to the servlet request 402.

Returning to FIG. 3, the router 204 selects a handler 206a . . . 206n that can process the servlet request 302, and transforms the servlet request 302 to a router request 304. The router 204 then forwards the router request 304 to a handler. In FIG. 3 the router request 304 is shown being forwarded to handler 1 (reference numeral 206a). However, the router request 304 may potentially be forwarded to any of the n handlers 206a, . . . 206n. Each handler 206a, . . . 206n may correspond to a specific application capable of processing a query received in the client request 300. For example, handler 206a may be capable of processing a particular type of query whereas handler 206b may be capable of processing another type of query. The router 204 selects the handler that can process the queries contained in the key and value pairs within the servlet request. The handler may perform a variety of tasks, including creating a database report, initiating a workflow process, sending out an electronic mail, preforming a network print function etc.

FIG. 4 illustrates an exemplary router request 404. The router request 404 includes an address of an handler along with the data included in the servlet request 402. The address of the handler is needed so that the router request 404 is sent to the correct handler 206a . . . 206n.

Returning to FIG. 3, the handler 206a interprets the router request 304 and generates a database request 306 to the database 107. The database request 306 may be encapsulated within IO (input output) objects. The database request 306 may request the database 107 to provide information based on the parameters received by the servlet 202 in the client request 300 from the Web browser 110. In one implementation the values of the parameters, included as user inputs, may have been transmitted from the client 110 within an URL as part of the client request 300 to the servlet 202. The parameters received by the servlet 202 have been transformed and included in the servlet request 302 and the router request 304.

FIG. 4 illustrates a database request 406. The database request 406 may include the address of sending handler 206a, the session identifier "ID" and the address of the router included in the router request 404. The database request 406 further includes a structured query language (SQL) command to return one or more database records where the "price" is "$10" and the "year" is "1998."

Returning to FIG. 3, the database 107 provides a database response 308, where the database response 308 may include the information requested by the database request 306, and sends the database response 308 to the sending handler 206a. The database response 308 may be encapsulated within Input Output objects.

FIG. 4 illustrates an exemplary database response 408. The database response 408 includes the session identifier "ID", the address of the handler derived from the database request 406. The address of the handler is for the handler for which the database response is intended, i.e. the handler 206a . . . 206n that called the database 107. The database response 408 also includes the database record for <widget43> in response to the SQL query included in the database request 406.

Returning to FIG. 3, the handler 206a converts the database response 308 to a handler response 310 and forwards the handler response 310 to the router 204. FIG. 4 illustrates an exemplary handler response 410 that includes the session identifier "ID", the address of the router for which the handler response is intended, and the database record for <widget43>. All the information included in the handler response 410 may already have been included in the database response 408, although the handler response 410 may be formatted in a different syntax than the database response 408. In alternative implementations, the handler 206a receives the router request 304 and generates the handler response 310 without consulting the database 107. Rather, the handler 206a may generate the handler response 310 by non-database operations, including processing the router request 304 with specialized code coupled to the handler 206a, by consulting a spreadsheet, by consulting a table, etc. The handler response 310 may also indicate how the data returned from the database should be formatted for a particular look and feel.

Returning to FIG. 3, the router 204 converts the handler response 310 to a router response 312 and sends the router response to the servlet 202. FIG. 4 illustrates an exemplary router response 412 that includes the session identifier "ID" and the database record for <widget43>. All the information included in the router response 412 may already have been included in the handler response 410, although the router response 412 may be formatted in a different syntax than the database response 408.

The servlet 202 may format the router response 312 into a servlet response 314, such as JSP (Java server page) response and send the servlet response 314 to the Web browser 110. The servlet response 314 from the servlet 202 corresponds to a response to the client request 300 received by the servlet 202. In alternative implementation, the servlet response 314 may be generated at the handler 206a or at the router 204.

FIG. 4 illustrates an exemplary servlet response 414. The servlet response 414 includes a dynamic HTML page containing the data record for <widget43>. The servlet response 414 is generated for the session with the session identifier "ID" of 533 contained in the router response 412 received by the servlet 202. Hence, in response to the client request 400 from the Web browser 110, the servlet 202 sends the servlet response 414, where the servlet response 414 includes the results generated as a consequence of interpreting the instructions contained within the client request 400. In certain implementations, data objects corresponding to the servlet response 314 may be deleted after the servlet response 314 has been sent to the Web browser 110.

The servlet 202 may be instantiated from a servlet class that includes the following methods:

(1) sendResponse: sends the servlet response 314 to the Web browser 110.
(2) transformGET: receives all GET requests from a URL received from the Web browser 110 and transforms all request parameters into a hashtable of key-value pairs in a format of the servlet request 302.
(3) transformPOST: receives all data posted from the Web browser 110 via the POST request, and transforms all request parameters into a hashtable of key-value pairs.
(4) initialize: reads all of the system's parameters included in the Web server 100 from a directory coupled to the Web server 100.
(5) createSession: creates a session if no session exists between the Web browser 110 and the servlet 202.
(6) route: performs routing functions including, securing a database connection 201i, sending a request to the router 204, and returning the database connection 201i back to the connection pool 201.

In certain implementations, all errors thrown by any downward layers are caught, logged, and handled at the servlet 202. Similarly, all successful commit transactions (such as for example an instruction such as "subtract $10.41 from my account") may also be handled in the servlet 202. In alternate implementations, error handling and commit transactions may be performed outside of the servlet 202.

In certain implementations, the router 204 and the handler 206a . . . 206n components may extend from a RequestProcessor class, where the RequestProcessor class may include methods for processing the hashtable to retrieve values out of the key-value pair. In certain implementations, a demultiplexer may be added to organize the requests and the handlers. The demultiplexer may also determine what page to send back to the Web browser 110.

In certain implementations, the IO classes used to communicate with the database 107 may extend from a DataIO class. The IO classes may contain all the methods required for using the database 107.

Figure 5:
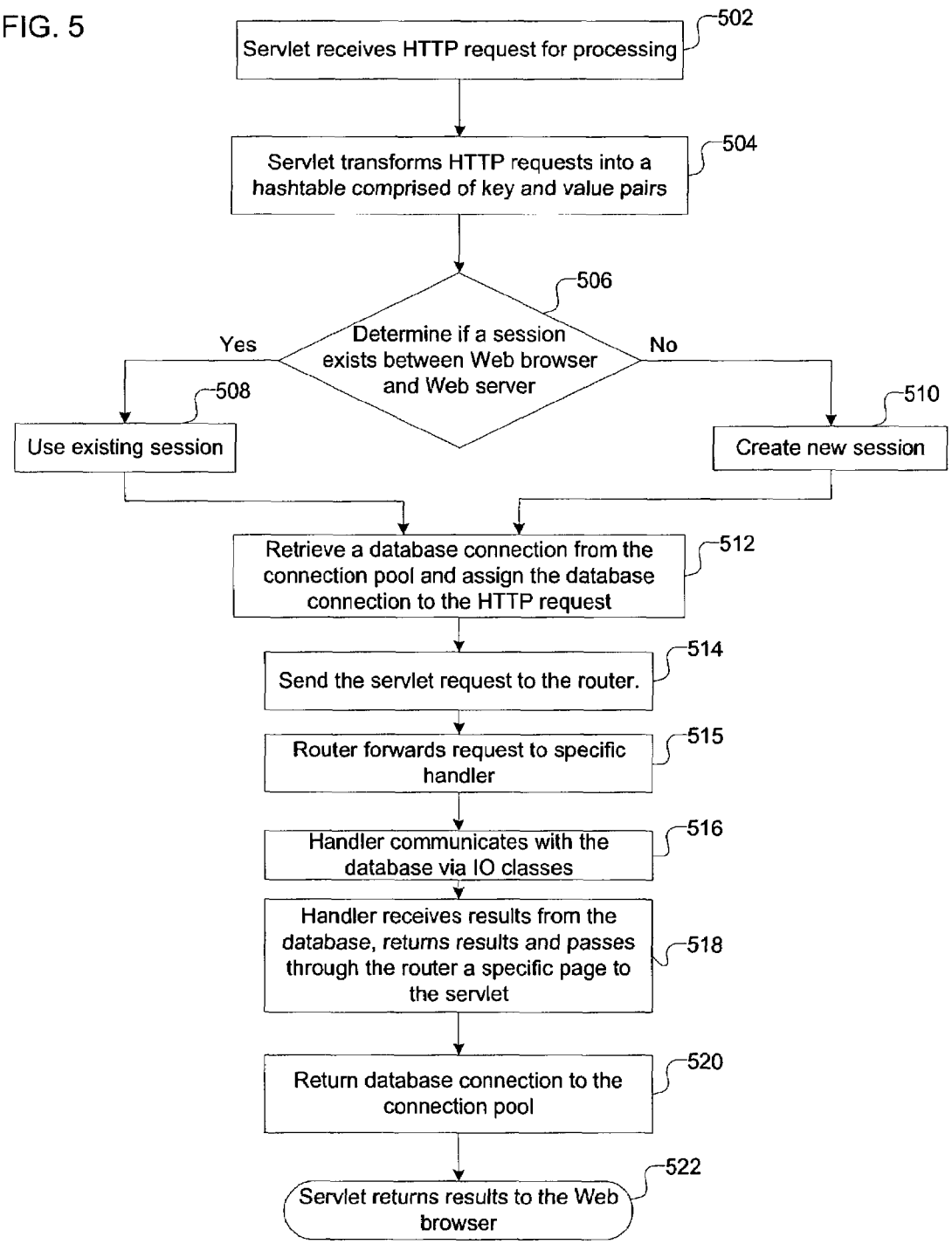
FIG. 5 illustrates logic implemented in a server side application, in which certain described aspects of the invention are implemented.

FIG. 5 illustrates logic implemented in the server side application 200, in which certain aspects of the invention are implemented. Control begins at block 502, where the servlet 202 receives a client request 300 for processing. The client request 300 may be from the Web browser 110. The client request 300 may contain HTTP requests such as POST, GET etc. The servlet 202 treats all such requests uniformly and at block 504 transforms the client request 300 into a hashtable consisting of key and value pairs as described in FIGS. 3 and 4. In one implementation, the transformGET and transformPUT methods described earlier are used to transform the client request 300. The key and value pairs represent the input parameters included in the HTTP request in a form interpretable by the components of the server side application 200.

Control proceeds to block 506 where the servlet 202 determines if a session exists between the browser 110 and the Web server 100. If a session exists, control proceeds to block 508, where the servlet 202 uses the existing session. If no session exists, control proceeds to block 510, where the servlet 202 creates a new session. In one implementation, the createSession method described earlier is used to create the new session.

From either block 508 or 510, control proceeds to block 512 where the servlet 202 retrieves a database connection from the connection pool 201 and assigns a representative database connection 201i to the client request 300. The database connection 201i and the transformed request described in block 504 may comprise a servlet request 302. Control proceeds to block 514, where the servlet 202, sends the servlet request 302 to the router 204. In one implementation, the route method described in FIG. 3 may be used to implement blocks 512 and 514.

Control proceeds to block 515, where the router 204 determines the appropriate handler, such as handler 206a, based on the type of the router request 304, and forwards the servlet request 302 to handler 206a, in the form of a router request 304.

The handler 206a, creates a database request 306 by creating an IO object from an input output class in the server side application 200. The handler 206a sends (at block 516) the database request 306 to the database 107 by encapsulating the database request 306 within the created IO object.

At block 518, the handler 206a receives a database response 308 including the result from the database 107 via an IO object. The handler 206a converts the database response 308 to a handler response 310 and forwards the handler response 310 to the router 204. The router 204 converts the handler response 310 to a router response 312 and sends the router response to the servlet 202.

Control proceeds to block 520, where the servlet 202 returns the database connection 201i to the connection pool 201. At block 522, the servlet 202 may format the router response 312 into a servlet response 314 and send the servlet response 314 to the Web browser 110. The servlet 202 may customize the database response 308 for proper look and feel rendering and return the formatted results to Web browser 110. The servlet response 314 from the servlet 202 is in response to the client request 300 received by the servlet 202. In certain implementations, the handler 206a or the router 204 may create the servlet response 314.

In certain implementations, the handler 206a . . . 206n may generate and send the handler response 310 without communicating with the database 107. In such a case, the handler 206a . . . 206n is capable of generating a response to the router request 304.

Figure 6:
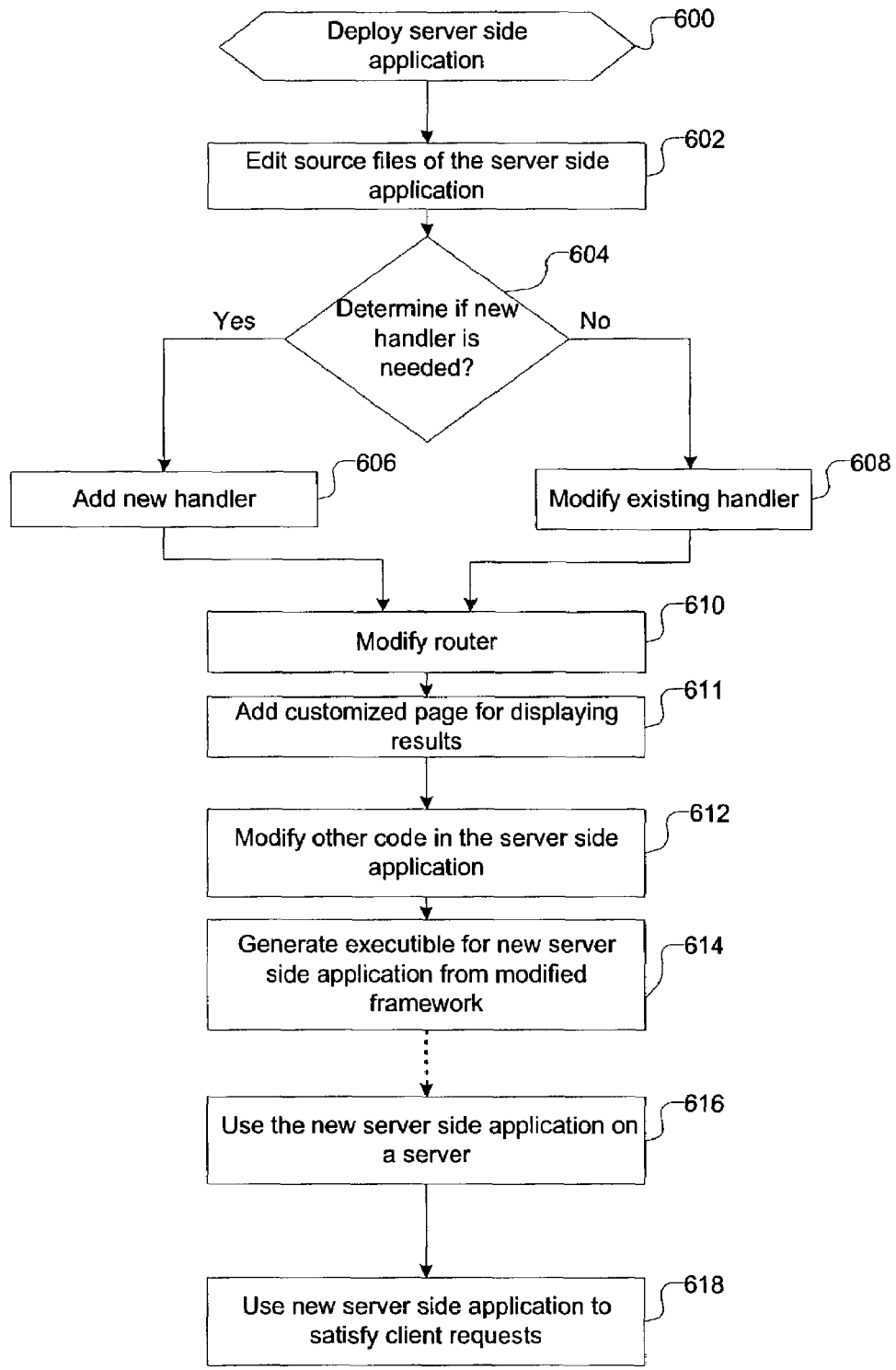
FIG. 6 illustrates logic to create a new application from a server side application and use the new application, in which certain described aspects of the invention are implemented.

FIG. 6 illustrates operations performed to create a new application from the server side application 200 and use the new server side application, in which certain aspects of the invention are implemented. The server side application 200 may be considered analogous to a server side application kit that may be adapted to generate a plurality of new server side applications. The server side application kit contains the servlet 202, the router 204, and the handlers 206a . . . 206n.

The process starts at block 600 by deploying the server side application 200 on the Web server 100. An entity such as an administrator or an automated script may perform the deployment. The entity may edit configuration files within the Web server 100 to connect to the appropriate database 107. The entity may also configure the Web server 100 to recognize the code corresponding to the server side application 200. Additionally, the entity may also activate a servlet engine code so that the servlet 202 can run on the Web server 100.

Control proceeds to block 602 where a programmer may start editing source files of the server side application 200 to create the new server side application from the server side application 200. The editing may be based on directives and documentation that may be included with the server side application 100.

Control proceeds to block 604, where the programmer determines if a new handler is required to implement the new application or an existing handler within the server side application 200 may be extended to create the new server side application. If a new handler is required, control proceeds to block 606, where a new handler is created. If an existing handler may be modified control proceeds to block 608, where an existing handler is modified.

Control proceeds to block 610, where the programmer modifies the code corresponding to the router 204 within the server side application 200 to select the appropriate handler depending on the servlet request 302. At block 611, the programmer adds a customized page for displaying results for the added or modified handler. The customized page may include banners, lines, pictures, etc. for additional information to be added to the customized page. The additional information may include the results generated in response to requests from the client 102. The programmer may then modify (at block 612) other code within the server side application 200 when creating the new server side application. In certain implementations, extension of the server side application 200 may be performed by modifying or extending components within the server side application 200. The process then generates (at block 614) one or more executable files from the extended server side application 200, where the executable files correspond to the new Web application.

The executable files may be used (at block 616) on a new server or left resident on the Web server 100. If left resident on the Web server 100, no reinstallation needs to be performed. In case of certain programming languages, no reinstallation may be needed when certain components of the server side application 200 are modified or extended. The executable files correspond to the new server side application. The new server side application satisfies (at block 618) requests 300 from the Web browser 110.

The implementations provide a server side application, where the server side application arranges the common steps of any server side application into a number of modular components. A programmer may modify some of the modular components of the server side application to implement a new server side application. In certain implementations the modular components include components such as the servlet 202 that are not modified. The components that are not modified retain complex tasks such as the processing of HTTP requests, and do not expose the interfaces to such complex tasks to the programmer. The programmer may modify components such as the router 204, and either modify existing handlers 206a . . . 206n or include a new handler to design and code a new server side application by extending the server side application 200. The programmer who designs and codes the new server side application need not know the details of HTTP processing and may be able to confine the new coding to specifics of the new application that are different from the existing server side application 200. As a result, the implementations simplify the development and maintenance of new server side applications.

Additional Implementation Details

The described techniques may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium (e.g., magnetic storage medium, such as hard disk drives, floppy disks, tape), optical storage (e.g., CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which implementations are made may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the implementations, and that the article of manufacture may comprise any information bearing medium known in the art.

Figure 7:
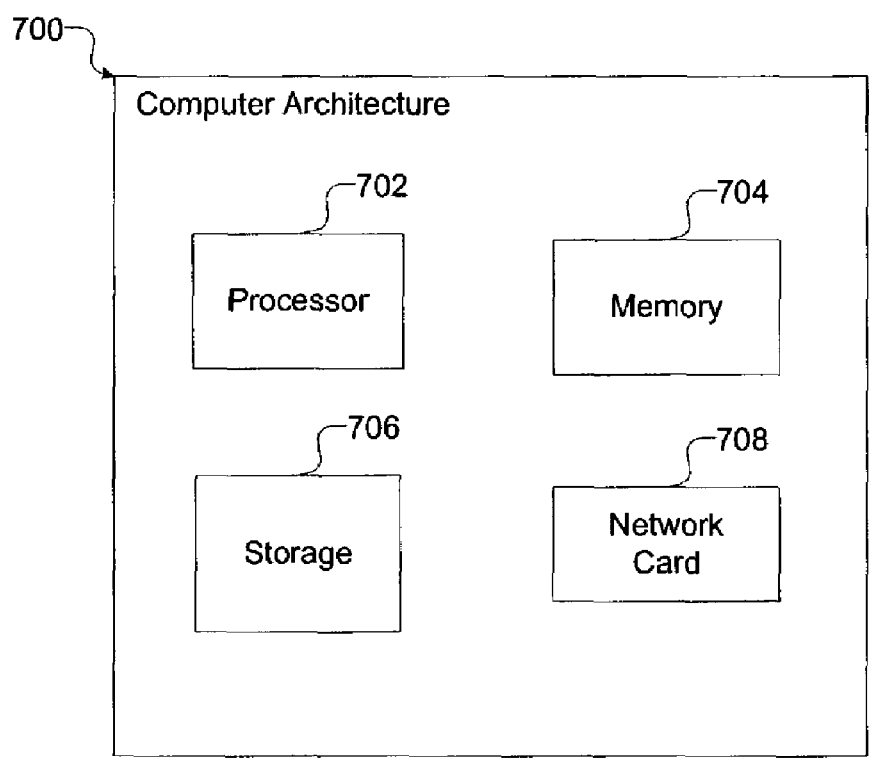
FIG. 7 illustrates a block diagram of a computer architecture in which certain described aspects of the invention are implemented.

FIG. 7 illustrates a block diagram of a computer architecture in which certain aspects of the invention are implemented. FIG. 7 illustrates one implementation of the Web server 100, the client 102, and the database server 106. These systems 100, 102, 106 may implement a computer architecture 700 having a processor 702 (e.g., a microprocessor), a memory 704 (e.g., a volatile memory device), and storage 706 (e.g., a non-volatile storage, such as magnetic disk drives, optical disk drives, a tape drive, etc.). The storage 706 may comprise an internal storage device or an attached or network accessible storage. Programs in the storage 706 may be loaded into the memory 704 and executed by the processor 702 in a manner known in the art. The architecture further includes a network card 708 to enable communication with a network.

The implementations of the server side application may be coded in any programming language known in the art such as Java, C, C++, LISP etc. In particular, in the Java programming language, the servlet response may be a JSP (not an acronym although popularly referred to as Java server pages) response. The servlet 202** is any server side application and is not limited to an implementation in any particular programming language.

In FIG. 4, addresses have been included in the requests and responses. Implementations may be constructed in which only the caller needs to know the callee. The callee may not need to know about the caller and may just need to answer. In such a case, many of the addresses may be eliminated from the requests and responses shown in FIG. 4. Also the responses may or may not include the ID shown in FIG. 4. The responses may just include the data to be returned. Any error while generating the responses may be thrown back to be processed by the servlet 202.

The implementations of FIGS. 4, 5, and 6 describe specific operations occurring in a particular order. Further, the steps may be performed in parallel as well as sequentially. In alternative embodiments, certain of the logic operations may be performed in a different order, modified or removed and still implement preferred embodiments of the present invention. Morever, steps may be added to the above described logic and still conform to the preferred embodiments. Still further operations may be performed by a single process or distributed across multiple processes.

While Web server 110 and client 110 communicate within a client-server paradigm in the described implementations, they may also communicate within a peer-to-peer or other paradigm. Furthermore, the functions of the servlet, router and handlers may be consolidated into one or more software modules. The servlet, router and handler components have been described for illustrative purposes.

Therefore, the foregoing description of the implementations has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for processing requests in a server side application, the method comprising:

receiving a first request in a first communications protocol from a client;

modifying the first request in a first communications protocol to create a communications protocol independent request, wherein the server side application modifies the first request in a first communications protocol into the communications protocol independent request comprising a table having key and value pairs corresponding to query parameters in the first request wherein said first request includes authentication data and cookies and wherein said communications protocol independent request is provided in a form interpretable by a server side application;

generating a response by processing the communications protocol independent request;

sending the generated response in the first communications protocol to the client;

wherein said first request includes user input encoded in a Uniform Resource Locator (URL); and submitting said first request including the user input encoded in the URL in response to Common Gateway Interface (CGI) based source code included within the server side application.

2. The method of claim 1, wherein the server side application comprises a plurality of components, including a servlet component, a router component, and a handler component, the method further comprising:

(i) receiving the request from the client at the servlet component, wherein the servlet component modifies the request to create the communications protocol independent request, and forwards the request to the router component, wherein the communications protocol independent request is created by removing commands specific to the communications protocol;

(ii) selecting the handler component at the router component and routing the forwarded request from the router component to the selected handler component; and (iii) processing with the selected handler component the routed request and generating information, wherein the information is to be included in the response.

3. The method of claim 2, wherein the generated information is based on data retrieved from a database by the selected handler component, the method further comprising:

receiving at the router component the generated information from the selected handler component;

sending from the router component the generated information to the servlet component; and sending from the servlet component the generated response including the generated information to the client.

4. The method of claim 2, wherein the router component and the selected handler component are modifiable by changing source code comprising the router component and the selected handler component and installing at least one executable file derived from the changed source code.

5. The method of claim 1, wherein the table is communications protocol independent.

6. The method of claim 1, wherein the communications protocol independent request does not include coding related to the communications protocol used to communicate the request from the client to the server side application.

7. The method of claim 1, wherein the server side application includes a servlet, wherein the request is an HTTP request, and wherein the method further comprises:

subsequent to receiving the request and prior to generating the response, (i) transforming at the servlet the HTTP request into a table, wherein the table has key and value pairs corresponding to query parameters in the HTTP request;

(ii) if a session already exists between the servlet and the client, using the session;

(iii) if the session does not exist between the servlet and the client, creating a new session;

(iv) retrieving a database connection from a connection pool, wherein the database connection is returned to the connection pool after the database connection has been used; and (v) assigning the database connection to the request, wherein after the assignment the request is independent of HTTP communication protocols.

8. The method of claim 1, wherein components of the server side application are modified to create a new server side application, wherein the modified components are independent of the communications protocol.

9. The method of claim 8, wherein the new server side application performs:

receiving one request in the communications protocol from one client;

modifying the one request to create one communications protocol independent request;

generating one response by processing the one communications protocol independent request; and sending the generated response in the communications protocol to the one client.

10. The method of claim 1 wherein said request includes user input transmitted in a Universal Resource Locator (URL).

11. A method for creating a server side application, the method comprising:

installing server side application components on a computational device, wherein the server side application components are coded to perform default request handling operations, wherein the default request handling operations include a first communication protocol to manage communications with remote clients submitting requests to the server side application, wherein the user specified server side application operations include implementing a mapping of the request into key value pairs corresponding to query parameters in the request;

receiving code modifications to at least one server side application component to cause the at least one server side component to perform user specified server side application operations that are independent of the first communications protocol; and generating executable code from the installed server side application components including the code modifications;

receiving a request at a servlet in the first communications protocol from a client as part of the default request handling operations;

modifying the first request in a first communications protocol at the servlet to create a communications protocol independent request as part of the default request handling operations, wherein the modifying the first request in a first communications protocol to create the communications protocol independent request is a part of the user specified server side application operations;

wherein said first request includes authentication data and cookies and wherein said communications protocol independent request is provided in a form interpretable by a server side application;

sending the communications protocol independent request to a router as part of the default request handling operations;

routing the communications protocol independent request from the router to a selected handler as part of the user specified server side application operations;

generating a response at the selected handler as part of the user specified server side application operations;

sending the generated response to the client from the servlet as part of the default request handling operations;

wherein said first request includes user input encoded in a Uniform Resource Locator (URL); and submitting said first request including the user input encoded in the URL in response to Common Gateway Interface (CGI) based source code included within the server side application.

12. The method of claim 11, wherein the code modifications to the server side application components include:

modifications to a handler component to make a call to an application program; and modifications to a router component to route requests to the created handler component.

13. The method of claim 12, wherein the application program comprises a database program, and wherein the call comprises a database query.

14. The method of claim 12, wherein the modifications to the handler component are made by modifying source code of an existing handler component within the server side application components.

15. The method of claim 12, wherein the modifications to the handler component are made by coding and adding a new handler component to the server side application components.

16. The method of claim 11, wherein the communication protocol is HTTP, and the default request handling operations further include a mapping that maps a HTTP request into a form independent of HTTP syntax.

17. The method of claim 16, wherein the mapping is to name value pairs corresponding to query parameters in the HTTP request, wherein the name value pairs are processed by the user specified server side application operations.

18. The method of claim 11 wherein modifying the first request in a first communications protocol at the servlet to create a communications protocol independent request as part of the default request handling operations comprises a table having key and value pairs corresponding to query parameters in the first request.

19. A system for processing requests, the system comprising:
  a server side application running on a first computer of said system;
  means for receiving a first request in a first communications protocol from a client at the server side application;
  means for modifying the first request in a first communications protocol to create a communications protocol independent request at the server side application;
  wherein said first request includes authentication data and cookies and wherein said communications protocol independent request is provided in a form interpretable by a server side application;
  means for generating a response by processing the communications protocol independent request at the server side application, wherein the server side application modifies the request into a table having key and value pairs corresponding to query parameters in the first request;
  means for sending the generated response in the first communications protocol to the client from the server side application;
  wherein said first request includes user input encoded in a Uniform Resource Locator (URL); and
  submitting said first request including the user input encoded in the URL in response to Common Gateway Interface (CGI) based source code included within the server side application.

20. The system of claim 19, wherein the server side application comprises a plurality of components; including a seavlet component, a router component and a handler component, the system further comprising:
  (i) means for receiving the request from the client at the servlet component, wherein the servlet component modifies the request to create the communications protocol independent request, and forwards the request to the router component, wherein the communications protocol independent request is created by removing commands specific to the communications protocol;
  (ii) means for selecting the handler component at the router component and routing the forwarded request from the router component to the selected handler component; and
  (iii) means for processing with the selected handler component the routed request and generating information, wherein the information is to be included in the response.

21. The system of claim 20, wherein the generated information is based on data retrieved from a database by the selected handler component, the system further comprising:
  means for receiving at the router component the generated information from the selected handler component;
  means for sending from the router component the generated information to the servlet component; and
  means for sending from the servlet component the generated response including the generated information to the client.

22. The system of claim 20, wherein the router component and the selected handler component are modifiable by changing source code comprising the router component and the selected handler component and installing at least one executable file derived from the changed source code.

23. The system of claim 19, wherein the table is communications protocol independent.

24. The system of claim 19, wherein the communications protocol independent request does not include coding related to the communications protocol used to communicate the request from the client to the server side application.

25. The system of claim 19, wherein the server side application includes a servlet, wherein the request is an HTTP request, and wherein the system performs:
subsequent to receiving the request and prior to generating the response,
  (i) transforming at the servlet the HTTP request into a table, wherein the table has key and value pairs corresponding to query parameters in the HTTP request;
  (ii) if a session already exists between the servlet and the client, using the session;
  (iii) if the session does not exist between the servlet and the client, creating a new session;
  (iv) retrieving a database connection from a connection pool, wherein the database connection is returned to the connection pool after the database connection has been used; and
  (v) assigning the database connection to the request, wherein after the assignment the request is independent of HTTP communication protocols.

26. The system of claim 19, wherein components of the server side application are modified to create a new server side application, wherein the modified components are independent of the communications protocol.

27. The system of claim 26, wherein the new server side application performs:
  receiving one request in the communications protocol from one client;
  modifying the one request to create one communications protocol independent request;
  generating one response by processing the one communications protocol independent request; and
  sending the generated response in the communications protocol to the one client.

28. The system of claim 19 wherein said request includes user input transmitted in a Universal Resource Locator (URL).

29. A system for creating a server side application, the system comprising:
  means for installing server side application components to be executed on a first computer of said system, wherein the server side application components are coded to perform default request handling operations, wherein the default request handling operations include a first communication protocol to manage communications with remote clients submitting requests to the server side application;
  means for receiving code modifications to at least one server side application component to cause the at least one server side component to perform user specified server side application operations that are independent of the communications protocol; and means for generating executable code from the installed server side application components including the code modifications;

means for receiving a first request at a servlet in the first communications protocol from a client as part of the default request handling operations;

means for modifying the first request in a first communications protocol at the servlet to create a communications protocol independent request as part of the default request handling operations, wherein the modifying the first request in a first communications protocol to create the communications protocol independent request is a part of the user specified server side application operations, wherein the user specified server side application operations include implementing a mapping of the request into key value pairs corresponding to query parameters in the first request in a first communications protocol;

wherein said first request includes authentication data and cookies and wherein said communications protocol independent request is provided in a form interpretable by a server side application;

means for sending the communications protocol independent request to a router as part of the default request handling operations;

means for routing the communications protocol independent request from the router to a selected handler as part of the user specified server side application operations;

means for generating a response at the selected handler as part of the user specified server side application operations;

means for sending the generated response in the first communications protocol to the client from the servlet as part of the default request handling operations;

wherein said first request includes user input encoded in a Uniform Resource Locator (URL); and submitting said first request including the user input encoded in the URL in response to Common Gateway Interface (CGI) based source code included within the server side application.

30. The system of claim 29, wherein the code modifications to the server side application components include:

modifications to a handler component to make a call to an application program; and modifications to a router component to route requests to the created handler component.

31. The system of claim 30, wherein the application program comprises a database program, and wherein the call comprises a database query.

32. The system of claim 30, wherein the modifications to the handler component are made by a means for modifying source code of an existing handler component within the server side application components.

33. The system of claim 30, wherein the modifications to the handler component are made by coding and adding a new handler component to the server side application components.

34. The system of claim 29, wherein the communication protocol is HTTP, and the default request handling operations further include a means for mapping that maps a HTTP request into a form independent of HTTP syntax.

35. The system of claim 34, wherein the means for mapping is to name value pairs corresponding to query parameters in the HTTP request, wherein the name value pairs are processed by the user specified server side application operations.

36. The system of claim 29 wherein the means for modifying the first request in a first communications protocol at the servlet to create a communications protocol independent request as part of the default request handling operations comprises a table having key and value pairs corresponding to query parameters in the first request.

37. An article of manufacture including a computer readable medium, wherein the article of manufacture is capable of causing operations, the operations comprising:

receiving a first request in a first communications protocol from a client;

modifying the first request in a first communications protocol to create a communications protocol independent request, wherein the server side application modifies the request into a table having key and value pairs corresponding to query parameters in the first request;

wherein said first request includes authentication data and cookies and wherein said communications protocol independent request is provided in a form interpretable by a server side application;

generating a response by processing the communications protocol independent request;

sending the generated response in the first communications protocol to the client;

wherein said first request includes user input encoded in a Uniform Resource Locator (URL); and submitting said first request including the user input encoded in the URL in response to Common Gateway Interface (CGI) based source code included within the server side application.

38. The article of manufacture of claim 37, wherein the server side application comprises a plurality of components, including a servlet component, a router component, and a handler component, the operations further comprising:

(i) receiving the request from the client at the servlet component, wherein the servlet component modifies the request to create the communications protocol independent request, and forwards the request to the router component, wherein the communications protocol independent request is created by removing commands specific to the communications protocol;

(ii) selecting the handler component at the router component and routing the forwarded request from the router component to the selected handler component; and (iii) processing with the selected handler component the routed request and generating information, wherein the information is to be included in the response.

39. The article of manufacture of claim 38, wherein the generated information is based on data retrieved from a database by the selected handler component, the operations further comprising:

receiving at the router component the generated information from the selected handler component;

sending from the router component the generated information to the servlet component; and sending from the servlet component the generated response including the generated information to the client.

40. The article of manufacture of claim 38, wherein the router component and the selected handler component are modifiable by changing source code comprising the router component and the selected handler component and installing at least one executable file derived from the changed source code.

41. The article of manufacture of claim 37, wherein the table is communications protocol independent.

42. The article of manufacture of claim 37, wherein the communications protocol independent request does not include coding related to the communications protocol used to communicate the request from the client to the server side application.

43. The article of manufacture of claim 37, wherein the server side application includes a servlet, wherein the request is an HTTP request, and wherein the operations further comprises:
subsequent to receiving the request and prior to generating the response,
(i) transforming at the servlet the HTTP request into a table, wherein the table has key and value pairs corresponding to query parameters in the HTTP request;
(ii) if a session already exists between the servlet and the client, using the session;
(iii) if the session does not exist between the servlet and the client, creating a new session;
(iv) retrieving a database connection from a connection pool, wherein the database connection is returned to the connection pool after the database connection has been used; and
(v) assigning the database connection to the request, wherein after the assignment the request is independent of HTTP communication protocols.

44. The article of manufacture of claim 37, wherein components of the server side application are modified to create a new server side application, wherein the modified components are independent of the communications protocol.

45. The article of manufacture of claim 44, wherein the new server side application performs:
receiving one request in the communications protocol from one client;
modifying the one request to create one communications protocol independent request;
generating one response by processing the one communications protocol independent request; and
sending the generated response in the communications protocol to the one client.

46. The article of manufacture of claim 37 wherein said request includes user input transmitted in a Universal Resource Locator (URL).

47. An article of manufacture including a computer readable medium, wherein the article of manufacture is capable of causing operations, the operations comprising:
installing server side application components on a computational device, wherein the server side application components are coded to perform default request handling operations, wherein the default request handling operations include a first communication protocol to manage communications with remote clients submitting requests to the server side application;
receiving code modifications to at least one server side application component to cause the at least one server side component to perform user specified server side application operations that are independent of the communications protocol;
generating executable code from the installed server side application components including the code modifications;
receiving a first request at a servlet in the first communications protocol from a client as part of the default request handling operations;
modifying the first request in a first communications protocol at the servlet to create a communications protocol independent request as part of the default request handling operations, wherein the modifying the first request in a first communications protocol to create the communications protocol independent request is a part of the user specified server side application operations, and wherein the user specified server side application operations include implementing a mapping of the request into key value pairs corresponding to query parameters in the first request;
wherein said first request includes authentication data and cookies and wherein said communications protocol independent request is provided in a form interpretable by a server side application;
sending the communications protocol independent request to a router as part of the default request handling operations;
routing the communications protocol independent request from the router to a selected handler as part of the user specified server side application operations;
generating a response at the selected handler as part of the user specified server side application operations;
sending the generated response in the first communications protocol to the client from the servlet as part of the default request handling operations;
wherein said first request includes user input encoded in a Uniform Resource Locator (URL); and
submitting said first request including the user input encoded in the URL in response to Common Gateway Interface CGI based source code included within the server side application.

48. The article of manufacture of claim 47, wherein the code modifications to the server side application components include:
modifications to a handler component to make a call to an application program; and
modifications to a router component to route requests to the created handler component.

49. The article of manufacture of claim 48, wherein the application program comprises a database program, and wherein the call comprises a database query.

50. The article of manufacture of claim 48, wherein the modifications to the handler component are made by modifying source code of an existing handler component within the server side application components.

51. The article of manufacture of claim 48, wherein the modifications to the handler component are made by coding and adding a new handler component to the server side application components.

52. The article of manufacture of claim 47, wherein the communication protocol is HTTP, and the default request handling operations further include a mapping that maps a HTTP request into a form independent of HTTP syntax.

53. The article of manufacture of claim 52, wherein the mapping is to name value pairs corresponding to query parameters in the HTTP request, wherein the name value pairs are processed by the user specified server side application operations.

54. The article of manufacture of claim 47 wherein modifying the first request in a first communications protocol at the servlet to create a communications protocol independent request as part of the default request handling operations comprises a table having key and value pairs corresponding to query parameters in the first request.

* * * * *